Patented June 19, 1945

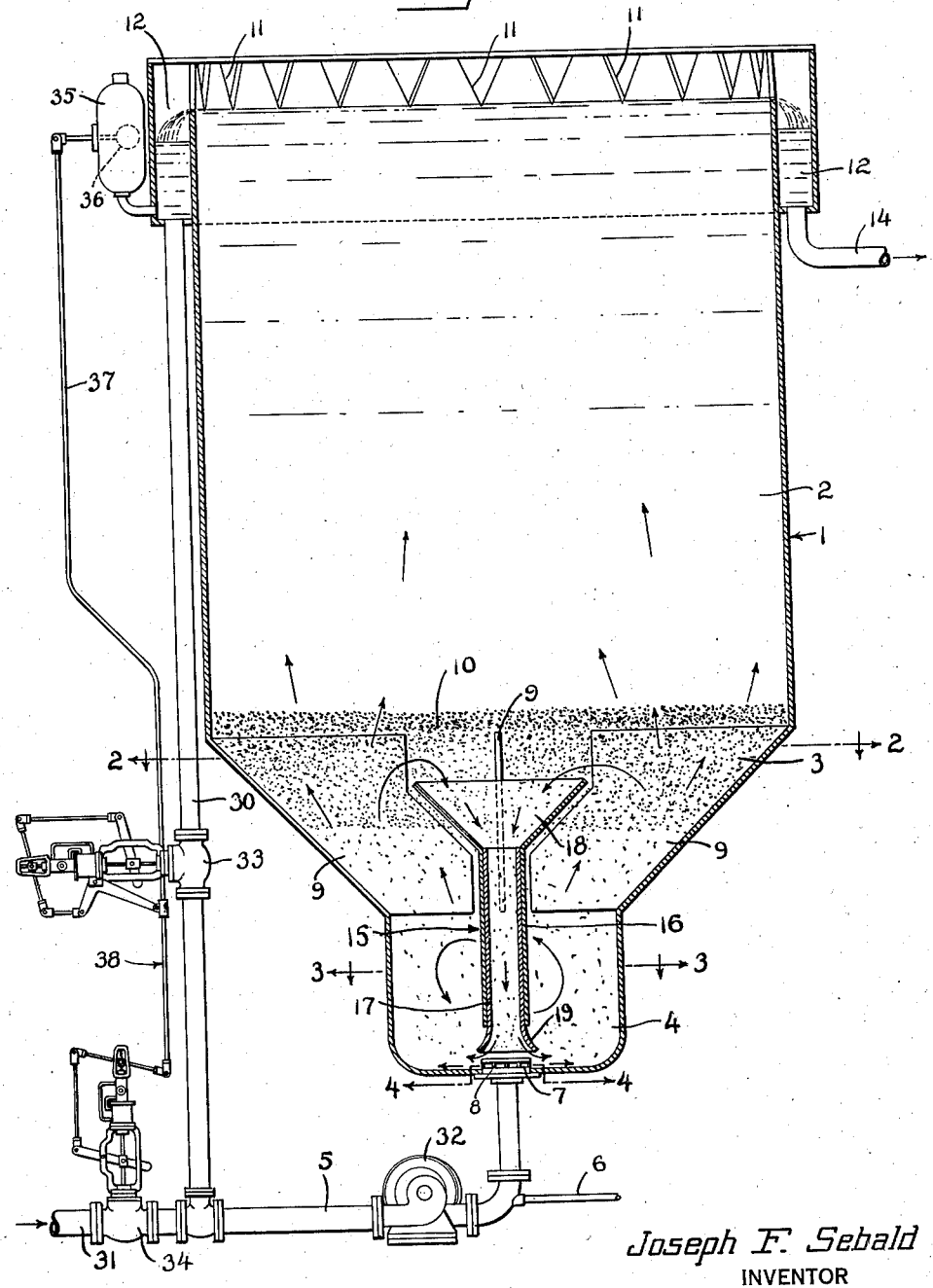

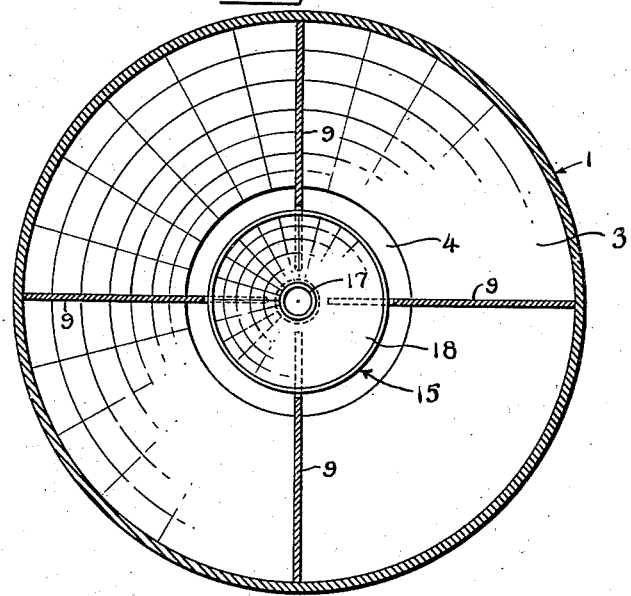
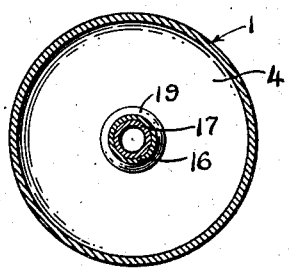
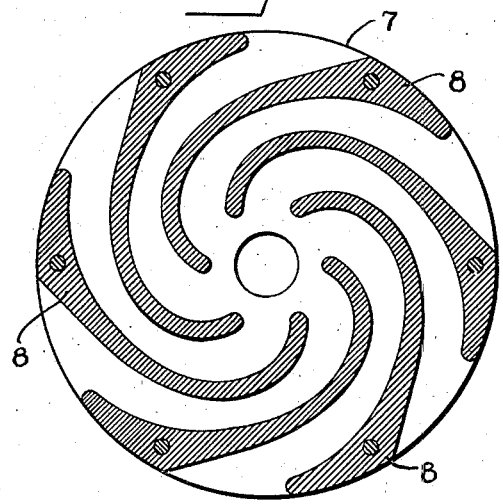

2,378,799

UNITED STATES PATENT OFFICE 2,378,799

WATER TREATING APPARATUS

Joseph F. Sebald, Bloomfield, N. J., assignor to Worthington Pump and Machinery Corporation, Harrison, N. J., a corporation of Delaware Application March 12, 1942, Serial No. 434,399

7 Claims. (Cl. 210—16)

This invention relates to water treating apparatus and more particularly to an improved cold process apparatus for softening, clarifying and purifying water.

The present invention embodies the advantages of the known fact that the addition of raw water and chemicals to a slurry containing previously precipitated particles improves and accelerates coagulation and purification of the water and accelerates the chemical and physical changes involved in separating out the formed substances or solids. The newly formed solids deposit by accretion on the particles present in the slurry, rather than separating out as new small particles. These particles are relatively stable and not readily subject to disintegration and are of such nature that clear, treated water is readily separated from the slurry.

An object of the present invention is to provide an apparatus operating on the principle as above outlined so constructed and arranged as to efficiently treat a predetermined quantity of water in a predetermined length of time, the over-all size of which apparatus is materially less than the over-all size of water treating apparatus of the approved types now on the market having the same capacity per interval of time.

Another object of the present invention is to provide a water treating apparatus as specified embodying non-power consuming, non-rotative means for provision of a high degree of mixing of the raw water and reagent or chemical, and embodying means for recirculating a mixture of the slurry, water and chemicals for hastening flocculation and formation of slurry accumulations in a filter bed above the recirculating zone.

A further object of the present invention is the provision of a storage space for a predetermined quantity of purified water, from which such purified treated water is drawn off for use, said storage space being separate from the main chamber of the apparatus and preferably concentrically arranged thereabout, thereby materially reducing the over-all height of the apparatus.

Another object of the present invention is to provide means in the form of recirculating apparatus for the treated water for maintaining substantially a constant flow of water through the apparatus, regardless of the load demand for treated water, thereby maintaining a uniform condition in the apparatus conducive to the maintenance of a slurry bed of optimum proportions and density.

With these and other objects in view, as may appear from the accompanying specification, the invention consists of various features of construction and combination of parts, which will be first described in connection with the accompanying drawings, showing a water treating apparatus of the preferred form embodying the invention, and the features forming the invention will be specifically pointed out in the claims.

In the drawings:

Figure 1 is a vertical section through the improved water treating apparatus.

Figure 2 is a cross-sectional view through the apparatus taken on the line 2—2 of Figure 1.

Figure 3 is a cross-sectional view through the apparatus taken on the line 3—3 of Figure 1.

Figure 4 is a detailed cross-sectional view through the diffusion or mixing mechanism, taken on the line 4—4 of Figure 1.

Referring more particularly to the drawings, the improved water treating apparatus comprises a treating receptacle 1 having an upper collection portion or chamber 2, an intermediate sedimentation or slurry collection portion 3, and a lower mixing portion or chamber 4. The intermediate sedimentation portion 3 decreases in cross-sectional area downwardly, being substantially in the shape of an inverted, truncated cone. The mixing and rotation chamber 4 extends downwardly from and is equal in cross-sectional area to the lowermost and smallest portion of the sedimentation portion 3.

The raw water to be treated enters the bottom of the mixing and rotation chamber or portion 4 through an inlet pipe 5, and the treatment chemicals or reagent are introduced into the raw water during its passage through the pipe 5, just prior to its entrance into the mixing and rotation chamber 4, by means of a suitable connection 6.

The raw water and chemical or reagent enter the bottom of the mixing, rotation chamber or portion of the apparatus from the pipe 5 through a stationary diffusion disc 7, which has a plurality of radially extending curved vanes 8 therein for imparting rotary movement to the raw water and chemical as they enter the mixing chamber 4, for increasing the mixing action in the chamber.

The mixed water and chemical rises from the mixing and rotation chamber 4 into the intermediate collection chamber or portion 3. A plurality of radiating baffles 9 extend across this sedimentation chamber 3 for arresting the rotary movement of the rising water and chemicals. As the mixture rises through this sedimentation portion 3, foreign material and impurities are precipitated from the water, forming particles, resulting in a slurry being formed containing such precipitated particles, water and chemicals. The precipitated particles accumulate at the top of the intermediate sedimentation or collection portion or chamber 3 in the form of a floc bed, indicated at 10. The treated, purified water filters through this floc bed 10 up into the upper collection space 2 of the apparatus, and during its passage through this floc bed 10, formed of previously precipitated particles, the newly formed small precipitated particles entrained in the water are deposited, by accretion, upon the previously precipitated particles, allowing the treated, purified water to pass up into the collection space 2, free of such precipitated impurities.

The upper edge of the wall of the receptacle 1 at the top of the upper collection space 2 is provided with a plurality of circumferentially spaced serrations or notches 11, allowing the treated water to flow from the collection space 2 into the storage compartment 12, from whence the treated water is drawn off through the outlet 14 to the point of use (not shown).

This storage compartment or chamber 12 is in the form of an annular chamber about the upper portion of the receptacle 1, separate from the interior of such receptacle and therefore free from the agitation within such chamber. By placing this storage compartment about the receptacle, the over-all height of the water treating apparatus is materially reduced.

To facilitate flocculation and the formation of slurry accumulations, means are provided for recirculating a part of the slurry collected in the intermediate sedimentation portion 3 back through the mixing and rotation chamber 4. As shown in the drawings, this means comprises an eductor tube 15, formed of a pair of telescopically connected tubes 16 and 17. The tube 16 has its upper end flared to form an inlet funnel-like entrance 18 at its top, while the lower end of the tube 17, at 19, flares outwardly in a curve. Thus the slurry is drawn into the eductor tube through the funnel-like entrance 18, travels downwardly through the tube, and enters the bottom of the mixing and rotation chamber 4, being directed outwardly toward the perimeter of said chamber 4 in a path substantially parallel to the path of the incoming, rotating stream of raw water and chemicals. This recirculated slurry mixes with the raw water and chemicals in the mixing and rotation chamber 4 and accelerates flocculation and the formation of slurry accumulations during the passage of the mixture through this mixing chamber 4 into the sedimentation chamber 3.

Through the telescopic construction of the tubes 16 and 17, the length of the eductor tube 15 may be varied and consequently the position of its funnel-shaped entrance 18 varied with respect to the level of the slurry bed 10, for regulating the quantity of slurry recirculated by varying the head through the eductor recirculator 15.

During operation of a water treating apparatus of the type covered by the present application the load demand for treated water varies. That is, the quantity of treated water withdrawn from the annular storage compartment 12 varies, and consequently the level of the treated water within such compartment varies.

The water treating apparatus of the present invention is constructed and designed to perform most efficiently with a predetermined quantity of water passing therethrough, such predetermined quantity being based upon the maximum capacity of the apparatus. Reduction of the quantity of water passing through the treating apparatus tends to lower its efficiency and affect the proper treatment of the water. Therefore, for the purpose of maintaining operation of the treating apparatus at its maximum efficiency, irrespective of the load demand thereupon, i. e., whether the demand for treated water is for full capacity or much less than full capacity of the apparatus, means are provided for recirculating a part of the treated water from the storage compartment through the treating apparatus, when the level of treated water in such storage compartment reaches or rises to a predetermined level, due to reduced demand.

The treated water recirculation mechanism comprises a pipe or connection 30, running from the storage compartment 12 and opening at its other end into the raw water supply pipe 31, in advance of the pump 32. A valve 33 is interposed in this pipe 30, and a second valve 34 is interposed in the raw water supply pipe 31.

A float valve structure, of any approved type, as shown at 35, is provided, in which the float 36 moves according to the variation in level of treated water in the annular storage compartment 12. The movement of the float 36 operates a rod 37, the latter being connected to the operating mechanism of the valves 33 and 34 by suitable linkage 38 so that said valves will be operated simultaneously, but in reverse directions the linkage structure shown in Figure 1 of the drawings for operating the valves 33 and 34 is merely any suitable conventional form of linkage which will effect operation of the valves and which can be purchased upon the open market consequently it forms no part of the present invention. That is, when the valve 33 is opened, the valve 34 will be closed, proportionately to the opening of the valve 33, and when the valve 33 is closed the valve 34 will be proportionately open. Thus the quantity of purified, treated water removed from the storage compartment 12 regulates the quantity of raw water delivered to the treating apparatus, as well as regulating the quantity of treated water recirculated through the apparatus. In other words, the amount of raw water supplied to the apparatus is controlled by and approximately equal to the amount of treated water withdrawn therefrom, and by the same means the quantity of treated water recirculated increases in inverse ratio to the quantity of raw water supplied, or the quantity of treated water withdrawn. In this manner, a constant, equal volume of flow of water is maintained through the apparatus and maximum efficiency thereof is obtained.

It will be understood that the invention is not to be limited to the specific construction or arrangement of parts shown, but that they may be widely modified within the invention defined by the claims.

What is claimed is:

1. In a precipitation water softening apparatus, a treating receptacle comprising an inverted truncated conical-like sedimentation portion and a cylindrical mixing portion below the sedimentation portion and forming an extension thereof, said mixing portion having a cross sectional area equal to the smallest cross sectional area of said sedimentation portion and being in unobstructed communication therewith, inlet means at the lower end of said mixing portion for delivering raw water and chemicals into the mixing portion, a stationary diffusion means for receiving raw water and chemicals from said inlet means and being so constructed and arranged as to impart a rotary mixing movement to the raw water and chemicals entering the mixing portion, a vertical eductor tube having its upper end positioned below the upper extremity of said sedimentation portion and its lower end arranged in close proximity to said diffusion means to cause material leaving said eductor tube to be picked up by water discharged by said diffusion means and passed in an upward rotating motion through said mixing portion, and a plurality of radial baffles in said conical-like sedimentation portion for arresting the rotary movement of the rising water and chemicals during their passage through the sedimentation portion, and means for withdrawing treated water from said receptacle above said sedimentation portion.

2. In a precipitation water softening apparatus, a treating receptacle comprising an inverted truncated conical-like sedimentation portion and a cylindrical mixing portion below the sedimentation portion and forming an extension thereof, said mixing portion having cross sectional area equal to the smallest cross sectional area of said sedimentation portion and being in unobstructed communication therewith, inlet means at the lower end of said mixing portion for delivering raw water and chemicals into the mixing portion, a stationary diffusion means for receiving raw water and chemicals from said inlet means and being so constructed and arranged as to impart a rotary mixing movement to the raw water and chemicals entering the mixing portion, a vertical eductor tube having its upper end positioned below the upper extremity of said sedimentation portion and its lower end arranged in close proximity to said diffusion means to cause material leaving the eductor tube to be picked up by water discharged by said diffusion means and passed in an upward rotating motion through said mixing portion to provide recirculation of mixture from said sedimentation portion with incoming raw water and chemicals, said receptacle including a collection portion for treated water, said eductor tube being adjustable longitudinally to position its upper end at different levels with respect to said sedimentation portion, means forming an annular storage space about said receptacle for receiving treated water from said collection portion, and means for withdrawing treated water from said storage space.

3. In a precipitation water softening apparatus, a treating receptacle comprising an inverted truncated conical-like sedimentation portion and a cylindrical mixing portion below the sedimentation portion and forming an extension thereof, said mixing portion having a cross sectional area equal to the smallest cross sectional area of said sedimentation portion and being in unobstructed communication therewith, inlet means at the lower end of said mixing portion for delivering raw water and chemicals into the mixing portion, a stationary diffusion means for receiving raw water and chemicals from said inlet means and being so constructed and arranged as to impart a rotary mixing movement to the raw water and chemicals entering the mixing portion, a vertical eductor tube having its upper end positioned below the upper extremity of said sedimentation portion and its lower end arranged in operative relationship with said diffusion means to cause recirculation of mixture from said sedimentation portion with the incoming raw water and chemicals, said receptacle including a collection portion for treated water, means forming an annular storage space about said receptacle for receiving treated water from said collection portion, a return pass connecting said storage space with said inlet means for recirculating treated water through said receptacle, and means actuated by variation in the level of treated water in said storage space for controlling the quantity of treated water flowing through said return pass.

4. In a precipitation water softening apparatus, a treating receptacle comprising an inverted truncated conical-like sedimentation portion and a cylindrical mixing portion below the sedimentation portion and forming an extension thereof, said mixing portion having a cross sectional area equal to the smallest cross sectional area of said sedimentation portion and being in unobstructed communication therewith, inlet means at the lower end of said mixing portion for delivering raw water and chemicals into the mixing portion, a stationary diffusion means for receiving raw water and chemicals from said inlet means and being so constructed and arranged as to impart a rotary mixing movement to the raw water and chemicals entering the mixing portion, a vertical eductor tube having its upper end positioned below the upper extremity of said sedimentation portion and its lower end arranged in operative relationship with said diffusion means to cause recirculation of mixture from said sedimentation portion with the incoming raw water and chemicals, said receptacle including a collection portion for treated water, means forming an annular storage space about said receptacle for receiving treated water from said collection portion, a return pass connecting said storage space with said inlet means for recirculating treated water through said receptacle, and means operatively connected with said inlet means and said return pass and actuated by variation in the level of treated water in said storage space for controlling the quantity of treated water flowing through said return pass and for regulating the quantity of raw water fed to said receptacle in inverse proportion to the quantity of treated water returned to the treating receptacle through said return pass.

5. In a water treating apparatus, a treating receptacle comprising a collection portion for treated water, a sedimentation portion and a mixing portion, said sedimentation portion being located below said collection portion and said mixing portion being located below said sedimentation portion, all of said portions having unobstructed communication one with the other, said mixing portion being of smaller cross sectional area than said sedimentation portion, said receptacle having an inlet for feeding raw water and chemicals into said mixing portion, a conduit in said receptacle having an inlet opening lying beneath the upper extremity of said sedimentation portion and an outlet opening located in said mixing portion for recirculating by gravity action mixed water and chemicals and precipitated floc through said mixing portion, said receptacle including a storage portion for treated water, a return pass connecting said storage portion with said mixing chamber to recirculate treated water through said treating receptacle, means actuated by variation in the level of treated water in said storage portion for controlling the quantity of treated water returned to said receptacle through said return pass, and stationary liquid impinging means in said mixing portion at said inlet for imparting a rotary mixing motion to all the liquids entering the mixing portion.

6. The invention claimed in claim 5 wherein said conduit is adjustable for length to adjust said inlet opening to different levels with respect to the sedimentation portion.

7. The invention claimed in claim 1 wherein said receptacle is provided with a treated water storage chamber, a conduit connecting said storage chamber with said inlet means for returning treated water to said receptacle, and means actuated by the level of treated water in said storage chamber and operatively connected with said conduit and said inlet means for regulating the quantity of raw water fed to the receptacle in inverse proportion to the quantity of treated water returned to said receptacle, said sedimentation portion being provided with baffles for arresting rotary motion of the mixed water and chemicals flowing therethrough.

JOSEPH F. SEBALD.